H. H. LOCKE & C. W. BORING.
CLUTCH PULLEY.
APPLICATION FILED JAN. 20, 1910.

965,825.

Patented July 26, 1910.

Witnesses
Inventors
H. H. Locke
C. W. Boring
By
Attorney

UNITED STATES PATENT OFFICE.

HENRY H. LOCKE, OF BRADFORD, AND CLEMENT W. BORING, OF BRADFORD TOWNSHIP, McKEAN COUNTY, PENNSYLVANIA.

CLUTCH-PULLEY.

965,825.  Specification of Letters Patent.  Patented July 26, 1910.

Application filed January 20, 1910. Serial No. 539,159.

*To all whom it may concern:*

Be it known that we, (1) HENRY H. LOCKE and (2) CLEMENT W. BORING, citizens of the United States, residing at (1) Bradford and (2) in Bradford township, in the county of McKean and State of Pennsylvania, have invented certain new and useful Improvements in Clutch-Pulleys, of which the following is a specification, reference being had therein to the accompanying drawing.

Our invention relates to improvements in clutch pulleys.

The object of our invention is to provide a pulley in which the friction surface is loosely mounted upon the body of the pulley and can be readily coupled or uncoupled to the body portion, whereby the belt does not have to be shifted to an idle pulley, but the bearing surface of the pulley is uncoupled from the body portion, whereby the pulley is free to rotate and the belt thereon is not driven.

Another object of our invention is to provide a more simple, cheap and effective pulley of this character having certain construction and advantages, which will be hereinafter more fully set forth in the specification.

Figure 1:
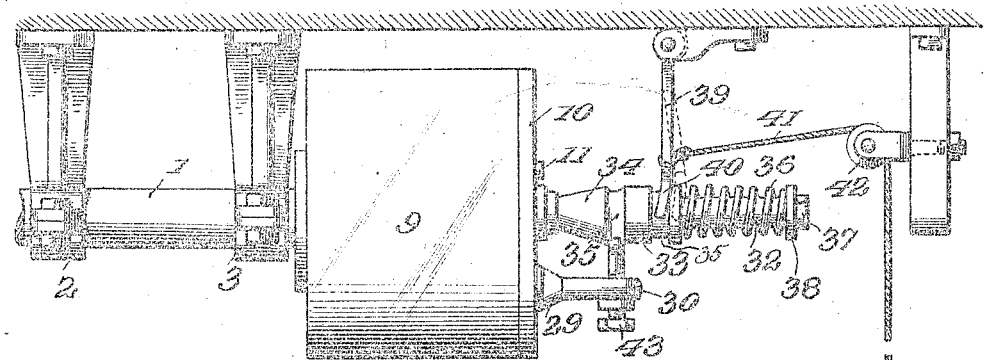
Figure 2:
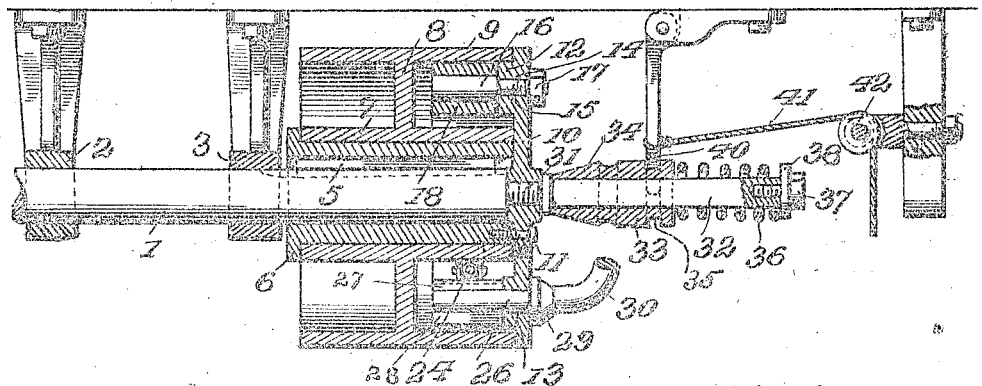
Figure 3:
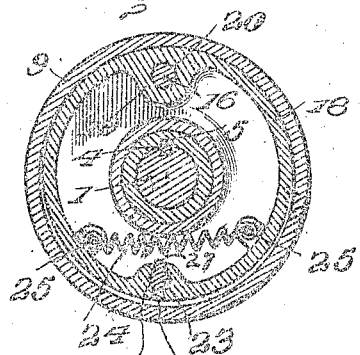
Figure 4:

In the accompanying drawings: Figure 1 is a side elevation of our improved pulley applied. Fig. 2 is a longitudinal vertical sectional view of Fig. 1. Fig. 3 is a transverse sectional view taken on the line 2—2, Fig. 2, showing the clutch band out of engagement with the friction surface. Fig. 4 is a transverse sectional view taken on the same line as Fig. 3, showing the clutch band locking the friction surface thereto.

Referring now to the drawing, 1 represents a shaft which may be mounted in any desired bearings, such as shown in the drawings and indicated at 2 and 3, and said shaft may be connected directly to the engine or motor, not shown, or may be driven by the engine by means of belting or gearing, all of which would form no part of our invention. The outer end of the shaft 1 has keyed thereon by means of the longitudinal key 4, a sleeve 5. The inner end of the sleeve is provided with an outwardly extending annular flange 6, forming an abutment for the sleeve 7, loosely mounted upon the sleeve. The sleeve 7, as shown, extends out flush with the outer end of the sleeve 5, and the sleeve 5 extends a slight distance beyond the shaft 1. The sleeve 7 has formed integral therewith at the center the outwardly extending radial web 8, said web carrying at its outer periphery the friction surface 9, which is formed integral with the web 8. The friction surface is in the form of a sleeve, as already shown, and is of a length exactly that of the sleeve 7. While we have shown and described the sleeve 7, web 8 and friction surface 9 all formed integral and cast, it will be understood that each and all of these parts could be made separately and secured together in any desired manner without departing from our invention.

At the outer end of the sleeve 5, is a disk 10, the outer periphery of which is flush with the periphery of the friction surface and said disk resting snugly against the outer end of the sleeve 5. Passing through openings in the disk are screw-bolts 11, which are screwed into the end of the sleeve 5, and whereby the disk is locked to the shaft, as will be clearly shown. We preferably use four of these screw-bolts to lock the disk on the sleeve arranged equal distances apart, but it will be understood that any desired number may be used.

The disk 10 on the inner face adjacent the outer periphery thereof, is provided with lugs 12 and 13, which extend within the bearing surface 9, of the pulley. The said disk and lug 12 are provided with an opening 14 through which passes the reduced end 15 of the pin 16. The outer end of the pin is screw-threaded and has screwed thereon a nut 17, whereby the pin is firmly clamped to the disk and rigidly supported thereby. Within the bearing surface is the expansion or friction disk ring 18, which is provided with an inwardly enlarged portion 19, having an opening 20 through which the pin 16 passes and by means of this pin the ring is supported and carried by the disk 10.

The ring 18 is provided with an enlarged portion 21, on the opposite side, and said ring being divided through said enlarged portion and having semicircular recesses 22 and 23 in opposite faces thereof. The ring being split it will be seen that centrifugal force will tend to throw the ring outwardly and cause a frictional engagement between the ring and the inner periphery of the bearing surface. In order to prevent this, we provide a coil spring 2, which has its ends extending between eyes 24 carried by the inner face of the rings and bolts 25 securing the ends of the springs thereto. The spring 23, as will be seen, normally holds the free ends of the ring close together with the ring away from the inner periphery of the friction surface and thus prevents any friction between the same, as clearly shown in Fig. 3 of the drawings.

Mounted in the disk 10 and extending through the lug 13, is a shaft 26 which extends within the recesses 22 and 23 and oscillates therein. The said shaft on opposite sides is provided with wings 27 and 28, which extend between the two ends of the expansion ring, as shown in Fig. 3, of the drawings.

The shaft 26 on the outside is provided with a flange 29, which holds the shaft against inward movement, while the outward movement of the shaft is limited by the wings 27 and 28. The outer end of the shaft is provided with a crank-arm 30.

The disk 10 is provided with a central screw-threaded opening 31, in which is screwed an outwardly extending shaft 32. Loosely mounted upon said shaft is a sleeve 33, said sleeve being longitudinally rotatably movable on the shaft independent thereof. The said sleeve is provided with a beveled portion 34 at its inner end, and an annular groove 35 at its outer end. Surrounding the shaft is a coiled spring 36, which bears against the outer end of the sleeve. Carried by the outer end of the shaft is a bolt 37, having an enlarged flange 38 against which the outer end of the spring bears, whereby the sleeve 33 is normally held in an inward position. By the bolt the tension of the spring can be varied.

Carried by the support or other frame upon which the pulley is mounted is a pivoted lever 39, having a bifurcated end 40, fitting into the peripheral groove 35 of the sleeve. Secured to the lever is a cable 41, passing over a pulley 42, and by means of which the sleeve 33 is moved on the shaft.

The crank arm 30 extends out adjacent the sleeve and is provided with an opening in which is screwed a bolt 43, which extends inwardly and engages the sleeve. The wings are carried by the shaft and the friction of the expansion rings on the wings holds the arm 30 in an inward position with the bolt 43 at all times engaging the sleeve 33.

The position of the sleeve 33, as shown in the drawings is such that the arm 30 is forced outwardly causing the shaft 26 to rock and the wings 27 and 28 engage the opposite ends of the expansion ring. This operation expands or separates the ends of the ring, causing the same to frictionally engage the inner periphery of the bearing surface and lock the same together. The ring being carried by the disk, which in turn is carried by the shaft, locks the friction surface to the shaft and rotates the same. By pulling the cord, the sleeve is moved outwardly allowing the arm to move inwardly and allow the free ends of the expansion ring to move toward each other and thus releasing the friction surface.

Having thus described our invention, what we claim and desire to secure by Letters Patent is—

1. A pulley of the character described, comprising a driving shaft, a sleeve keyed thereon, a friction surface loosely mounted upon the sleeve, a radially extending member carried at the outer end of the sleeve, a split ring supported by the radial member within the friction surface, a rock shaft mounted in the radial member and extending between the ends of the ring and having wings, adapted to engage the ends of the ring and expand the same against the friction surface, and means for rocking said shaft.

2. A pulley of the character described, comprising a driving shaft, a friction surface loosely mounted thereon, a disk rigidly carried by the shaft, a pin carried by the disk and extending within the friction surface, a split ring carried by the pin within the friction surface, a rock shaft mounted in the disk and extending between the ends of the rings and having wings adapted to engage the ends of the ring and expand the same against the friction surface and means for rocking said rock shaft.

3. A pulley of the character described, comprising a driving shaft, a friction surface loosely mounted thereon, a disk rigidly carried by the shaft, a pin carried by the disk and extending within the friction surface, a split ring carried by the pin within the friction surface, a rock shaft mounted in the disk and extending between the ends of the ring and adapted to expand said ring.

4. A pulley of the character described, comprising a driving shaft, a friction surface rotatably mounted upon the shaft, a disk rigidly secured to the shaft, a pin carried by the disk and extending within the friction surface, a pin carried by the disk, a split ring carried by the pin within the friction surface, the free ends of the ring having an enlarged portion having semicircular bearing portions, a rock shaft mounted in the disk and extending in said bearing portion, wings carried by the shaft and engaging the ends of the split ring, a shaft rigidly secured to the outer face of the disk, a sleeve carried by said shaft and longitudinally movable thereon and a beveled surface, a spring for normally holding the sleeve inwardly, a set screw adjustably carried by the rock shaft and engaging the sleeve and means for moving the sleeve on the shaft.

5. A pulley of the character described, comprising a driving shaft, a sleeve keyed thereon, a friction surface loosely mounted upon the sleeve, a disk rigidly secured to the outer end of the sleeve, a pin carried by the disk and extending within the friction surface, a split ring carried by the pin within the friction surface, a rock shaft mounted in the disk and extending between the ends of the ring and having wings adapted to engage the ends of the ring and expand the same against the friction surface and means for rocking said rock shaft.

6. A pulley of the character described, comprising a driving shaft, a sleeve keyed upon the shaft, a sleeve rotatably mounted upon the keyed sleeve, a radial web carried thereby, a friction surface carried by the said web, a disk rigidly secured to the outer end of the keyed sleeve, a pin carried by the disk and extending within the friction surface, a split ring carried by the ring within the friction surface, the free ends of the ring having enlarged portion having semicircular bearing portions, a rock shaft mounted in the disk and extending in said bearing portion, wings carried by the shaft and engaging the ends of the split ring, a shaft rigidly secured to the outer face of the disk, a sleeve carried by the shaft and longitudinally movable thereon and having a beveled surface, a spring for normally holding the sleeve inwardly, and in the path of said rock shaft, and means for moving said sleeve on the shaft.

In testimony whereof we hereunto affix our signatures in the presence of two witnesses.

HENRY H. LOCKE.
CLEMENT W. BORING.

Witnesses:
EDWARD JIFKINS,
HERMAN H. NORTH.